US008784768B2

(12) United States Patent
Cai et al.

(10) Patent No.: US 8,784,768 B2
(45) Date of Patent: Jul. 22, 2014

(54) HIERARCHIALLY POROUS CARBON PARTICLES FOR ELECTROCHEMICAL APPLICATIONS

(75) Inventors: Mei Cai, Bloomfield Hills, MI (US); Yunfeng Lu, Los Angeles, CA (US); Zheng Chen, Los Angeles, CA (US)

(73) Assignees: GM Global Technology Operations LLC, Detroit, MI (US); The Regents of The University of California, Oakland, CA (US)

( * ) Notice: Subject to any disclaimer, the term of this patent is extended or adjusted under 35 U.S.C. 154(b) by 371 days.

(21) Appl. No.: 13/116,392

(22) Filed: May 26, 2011

(65) Prior Publication Data

US 2012/0300364 A1    Nov. 29, 2012

(51) Int. Cl.
*C01B 31/02* (2006.01)

(52) U.S. Cl.
USPC ...................................... 423/448; 423/445 R

(58) Field of Classification Search
USPC ............................................. 423/445 R, 448
See application file for complete search history.

(56) References Cited

U.S. PATENT DOCUMENTS

| 7,887,771 | B2 * | 2/2011 | Sun et al. ................... 423/445 R |
| 8,361,663 | B2 * | 1/2013 | Kang et al. ..................... 429/405 |
| 2009/0154062 | A1 | 6/2009 | Yamada et al. |

OTHER PUBLICATIONS

Elzbieta Frackowiak; Carbon materials for supercapacitor application; Physical Chemistry Chemical Physics; Phy. Chem. Chem. Phys., 2007, 9, 1774-1785.

* cited by examiner

*Primary Examiner* — Stuart Hendrickson
(74) *Attorney, Agent, or Firm* — Reising Ethington P.C.

(57) ABSTRACT

Hierarchically porous graphitic carbon particles are prepared by an aerosol process using a aqueous solution of a carbon precursor compound in which different sized particles or clusters of silicon oxide species are dispersed. The aerosol is heated to evaporate the solvent. The solid residue is carbonized and non-carbon species removed to obtain small porous particles of graphitic carbon. The interconnected, different size pores in the small carbon particles make them very useful as electrode materials in electrochemical devices, such as supercapacitors, in which efficient ion transport through the pores or the particles is required.

5 Claims, 8 Drawing Sheets

HIERARCHIALLY POROUS CARBON PARTICLES FOR ELECTROCHEMICAL APPLICATIONS

TECHNICAL FIELD

This invention pertains to the making of particles of porous, graphitized carbon spheres having diameters ranging from about fifty nanometers to a few micrometers and containing an abundance of micropores (e.g., <2 nanometers in largest dimension) interconnected with mesopores (e.g., about two to twenty nanometers). These particles provide excellent properties as, for example, electrode materials in electrochemical applications such as in supercapacitors.

BACKGROUND OF THE INVENTION

Supercapacitors, a class of electrical-energy-storage devices with high power density ($10^3$-$10^4$ W kg$^{-1}$) and long cycling life (>100,000 cycles), hold great promise for a broad spectrum of applications, such as hybrid electric vehicles, power tools and mobile electronic devices. Generally, a supercapacitor may be operated based on the electrochemical double-layer capacitance (EDLC) formed along an electrode/electrolyte interface of an electrochemical cell. For example, a device is assembled by two electrodes made with the same carbon material and separated by a porous separator soaked in electrolyte. The charge (energy) is stored by separating electrolyte ions of opposing charges on the surface of porous carbon in the electrodes. Specifically, during the charge process, the positively charged ions will immigrate to a negative electrode and form a charged double layer; at the same time, the negative charged ions will accumulate on the surface of a positive electrode and form another double layer. The rapid charge/discharge process provides the capacitor with a high power density, yet the energy density is limited by its effective double-layer area. Therefore, a high surface-area carbon with optimal pore structure is highly desired for high performance device application.

However, current supercapacitors are still limited by low energy density, and improving the energy density while maintaining high power density is essential to realize such great potentials. Since supercapacitors generally rely on electrical double-layer capacitance or pseudo-capacitance, to realize high energy density requires a sufficient number of ions to be absorbed on or inserted into the electrodes, while realizing high power density requires rapid transport of ions and electrons between the electrodes. To satisfy these criteria, the electrode materials should exhibit high ion-storage density, excellent electronic conductivity, and effective ion-transport capability.

The current electrode materials for supercapacitors are mainly activated carbons, carbon nanotubes (CNTs) and metal oxides. In this context, activated carbons (AC) possess high surface area, high microporosity and moderate electronic conductivity. Capacitances up to 300 F g$^{-1}$ in aqueous electrolyte or 120 F g$^{-1}$ in organic electrolyte may be achieved at low discharge rates, which correspond to energy densities of ~10 and 30 Wh kg$^{-1}$, respectively. At high discharge rates, however, their storage performance radically deteriorates due to the lagged ion transport within their torturous microporous channels. Carbon nanotubes (CNTs), on the other hand, possess excellent electronic conductivity and readily accessible external surfaces that can provide outstanding rate performance. However, CNTs generally possess low surface areas, which provide low specific capacitances of less than 100 F g$^{-1}$ in aqueous electrolyte or 50 F g$^{-1}$ in organic electrolyte, respectively. Alternatively, metal oxides, such as $RuO_2$, $MnO_2$ and $V_2O_5$ may provide much higher pseudo-capacitance through faradic reactions. Except the cost-prohibitive $RuO_2$, however, such materials are intrinsically poor ionic and electronic conductors, which limit their high-power application. Much effort has been devoted to making better electrode materials recently. For example, high-surface-area carbons with more regulated pore channels, such as carbide-derived carbon and zeolite-templated carbon, were synthesized with capacitances up to 150 F g$^{-1}$ and improved high-rate performance in organic electrolytes, however, their synthesis is extremely ineffective. Similarly, surface functionalized CNTs may provide capacitances up to ~150 F g$^{-1}$ in $H_2SO_4$; however, such modified CNTs are easily degraded during cycling. Accordingly, making high-performance supercapacitor materials remains a challenge.

SUMMARY OF THE INVENTION

This invention provides for the design and fabrication of high-performance materials as electrode materials for electrochemical applications based on hierarchically porous graphite particles. Accordingly, supercapacitor electrodes (or the like) of this invention are constructed from such particles containing interconnected micropores (typically <2 nm), mesopores (e.g., about 2-20 nm) and macropores (e.g., >50 nm). In comparison to the activated carbons with low rate capability, and CNTs with low capacitance, this unique porous graphite particle structure of this invention provides the critical features required for high-performance electrodes: i) abundant micropores provide the electrode material with high surface areas, resulting in large capacitance and high energy density, ii) small particle size and their hierarchically interconnected micropores, mesopores and macropores (within larger particles and between particles) facilitate ion transport, which ensure high rate capability; iii) graphitized carbon provides excellent electronic conductivity that is another key factor for high rate capability; iv) these carbon spheres can be densely packed into electrodes, which is of importance to ensure high volumetric energy density.

In accordance with preferred embodiments of the invention, an aqueous solution of a suitable carbon compound is prepared as a source of carbon particles. The carbon compound is to be decomposed, and a simple carbohydrate such as sucrose is preferred so that it readily decomposes into carbon with water as innocuous by-product. A water soluble phenol resin or other relatively low molecular weight carbon compound or polymer may be used. A metal (e.g., transition metal) salt (e.g., nickel nitrate, nickel nitrite, nickel chloride, nickel acetate, iron nitrate, iron chloride, iron nitrite, cobalt nitrate, cobalt chloride, cobalt acetate, and cobalt nitrite) is also dissolved in the aqueous solution to promote decomposition of the carbon precursor. Colloidal silica particles and orthosilicate clusters are also dispersed in the aqueous solution to serve as templates for mesopores (the silica particles) and micropores (the silicate clusters). Carbon particles with different pore structures may be obtained by varying the ratio of colloidal silica particles and orthosilicate clusters. For example, a larger amount or proportion of colloidal silica will produce carbon particles with more mesopores and larger pore volume: a larger amount of orthosilicate clusters will produce particles with higher surface area and smaller pores and pore volume.

Aerosol droplets are formed from the aqueous solution with its suspended template material, using nitrogen as the atomizing and carrier gas. The continuously-generated, colloidal aerosol droplets are carried in a stream of passed through a heating zone in which the water (or other solvent) is evaporated and the solid residue converted to nanometer size composite particles. The particles are of generally spherical shape. The spherical particles are collected as they leave the heating zone. The separated particles are further heated to carbonize the organic precursor material in the presence of the metal and the silicon-containing moieties. The sucrose (or other carbon-containing compound) is thus converted in-situ into graphitized carbon with entrained metal and silicon oxide species. The metal is removed and the silicon-containing template materials are removed to yield porous graphitic carbon particles with high surface area and hierarchical pores.

The resulting graphitized carbon particles are generally spherical in shape with diameters typically ranging from about fifty to about three hundred nanometers with some particles having diameters up to a few (five or so) micrometers. And, as a result of the use of different sized silicon oxide precursors, the carbon particles have a hierarchy of interconnected micropores and mesopores. As will be demonstrated in this specification, such particles have excellent properties for close packing in electrode material layers and for adsorption of ions of a liquid electrolyte as electrode materials on electrochemical devices.

It is also to be noted that the described synthesis approach may be readily scaled up at low cost for large scale production these unique close packing, high surface area, hierarchically porous carbon particles.

Other objects and advantages of the invention will be apparent from the following presentation of specific examples of practices of the invention. Reference will be made to drawing figures which are described in the following section of this specification.

DESCRIPTION OF PREFERRED EMBODIMENTS

Synthesis of Porous Graphitized Carbon Nanoparticles

For the synthesis of the graphitized carbon particles, aqueous solutions were prepared containing 40 mL of de-ionized water, 12 g of sucrose, 10 g of nickel nitrate hexahydrate (Ni(NO$_3$)$_2$·6H$_2$O), 20 g of 0.1 M HCl, 20 g of colloidal silica particles (AS 30%, Nissan Chemicals. Inc.), and 16 g of tetraethylorthosilicate (TEOS, as silicate templates). Quantities of the solution were placed in an atomizer as illustrated in FIG. 1.

Figure 1:
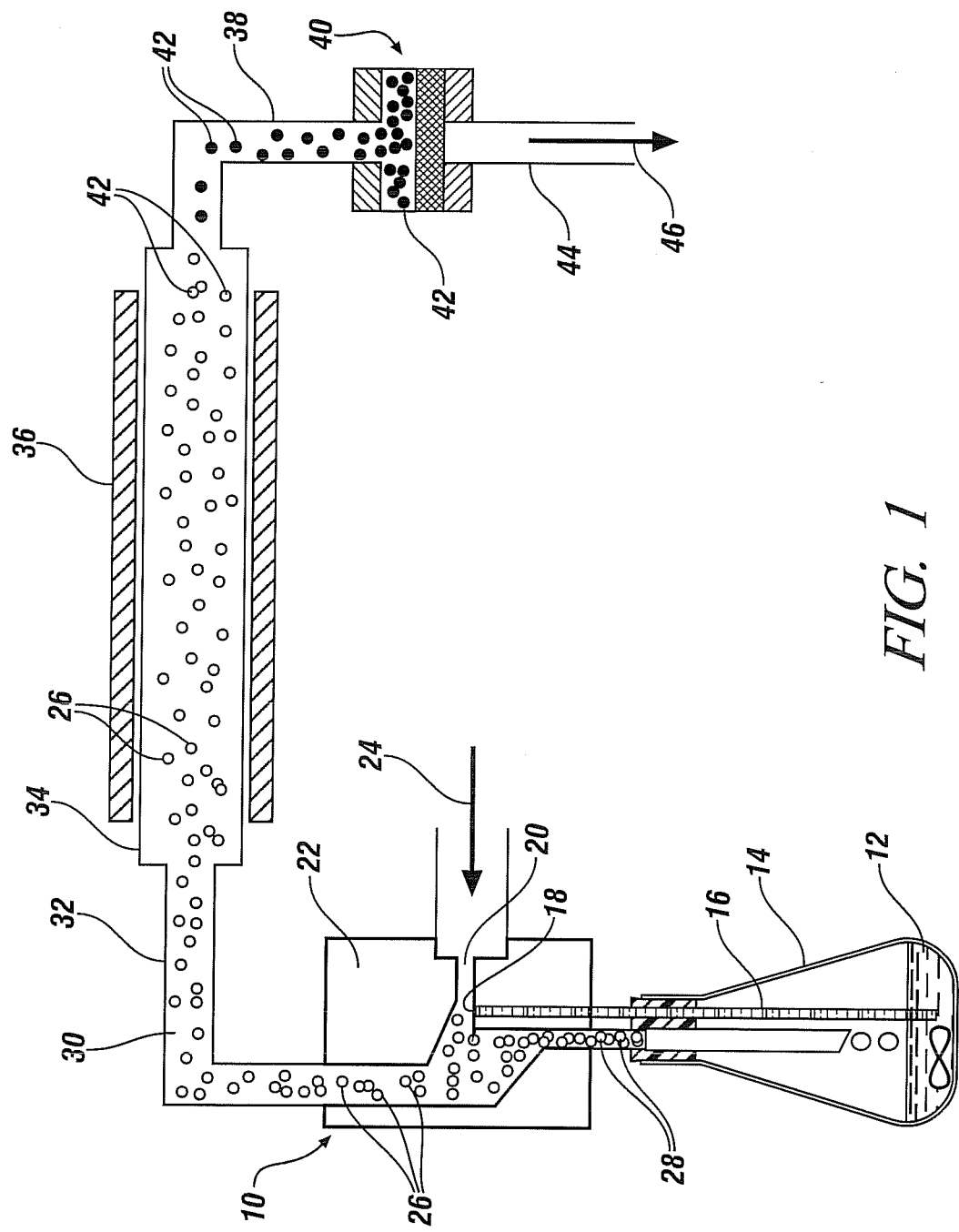
FIG. 1 is a schematic illustration of an apparatus used in conducting an aerosol process for preparing porous carbon particles in accordance with embodiments of this invention.

FIG. 1 is a schematic drawing, partly in cross-section, illustrating the use of a commercial laboratory size atomizer 10 (Model 3076, TSI, Inc. St. Paul, Minn.) operated with nitrogen as a carrier/atomization gas. This atomizer produces aerosol droplets with a size distribution characterized by a geometric standard deviation of 2 (95% of the liquid particles have diameters between 0.25 and 4 times the mean diameter).

A solution of sucrose carbon precursor with nickel nitrate carbonization catalyst and dispersed silica and silicate material 12 as described in the above paragraph is placed in a suitable container or reservoir 14. A vertically-oriented draw tube 16 provides a passage for a stream of the precursor solution 12 from its reservoir 14 to pinhole 18, an opening into atomization gas inlet 20 in the atomizer body 22. A stream of nitrogen gas (or other suitable atomization gas), indicated by directional arrow 24 is introduced into atomization gas inlet 20, reducing the pressure at pinhole 18. In an illustrative operation of atomizer 10, nitrogen gas under an initial pressure of 40 psig was introduced under laminar flow condition through inlet 20 into the atomizer body 22 at a flow rate of 2.6 L (STP)/min. This nitrogen gas flow produced a pressure drop at pin hole 18, permitting the atmospheric pressure acting on solution 12 to push a stream of the precursor solution up through draw tube 16 to pinhole 18. Precursor solution entering the atomization stream 24 is converted to very small colloidal aerosol particles 26 (schematically enlarged in FIG. 1). As stated above, the aerosol particles vary in size. Some of the larger particles 28 fall back as liquid droplets into precursor solution 12. But many of the aerosol particles 26 are carried in the flow of nitrogen atomization gas 24. This combined stream of nitrogen gas and aerosol particles 26 leaves the atomizer body 22 in tubular passage 32 and is now indicated as combined stream 30 in FIG. 1. Continually-flowing combined stream 30 now also contains vaporized water (solvent) from precursor solution 12.

Combined stream 30 enters the inlet end of a one-inch inside-diameter, round glass/quartz/ceramic tube 34 which is enclosed in an electrical resistance heated tubular furnace 36. Furnace 36 is controlled to heat glass/quartz/ceramic tube 34 and the combined stream 30 to about 450° C. The residence time (a second or so) of the flowing combined stream 30 in tube 34 is suitable for the heat to cause substantially complete evaporation of the solvent and to commence degradation of the sucrose and tetraethyl othosilicate. Combined stream 30 now contains solid particles comprising charred sucrose, nickel and silica template materials, as well as the nitrogen atomization gas. Combined stream 30 exits glass/quartz/ceramic tube 34 through passage 38 and is directed through filter 40. Filter 40 is heated and maintained, for example, at about 80° C. It collects the charred sucrose-nickel-silica-silicate particles 42 while permitting the exhaust stream 46 of nitrogen and ligand degradation products through outlet passage 44.

The particles were removed from the filter press and subsequently heated to 900° C. to carbonize the sucrose content of the composite nanoparticles under nitrogen atmosphere. This carbonization step resulted in the formation of spherical silica/graphitized carbon/nickel composite nanoparticles. The composite particles were soaked in 1M aqueous hydrochloric acid to remove the nickel, and then in 5M aqueous sodium hydroxide to remove the silica/silicate template materials. The removal of these constituents yielded the hierarchically porous carbon particles with graphitized shell structures.

Figure 2:
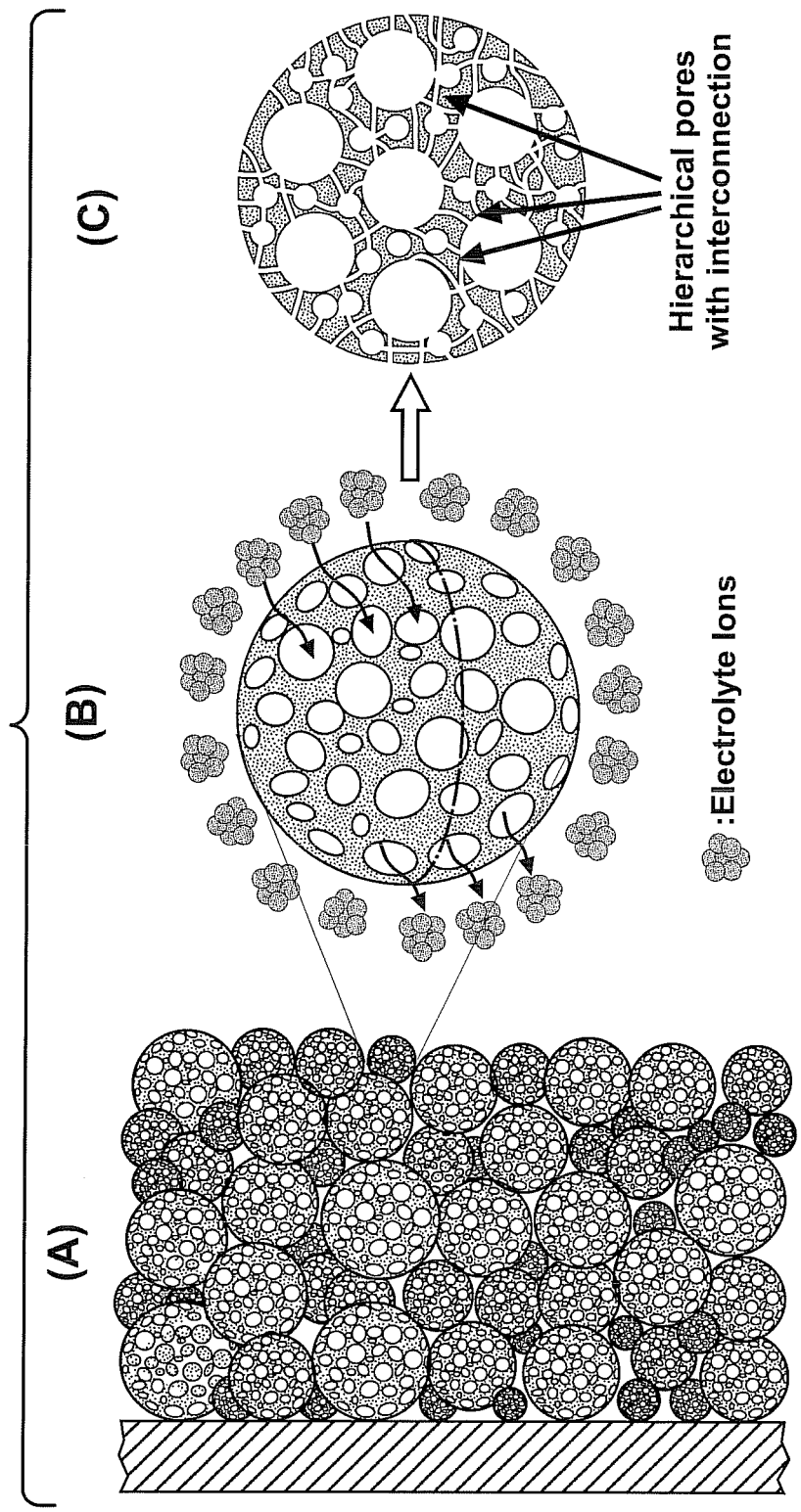
FIG. 2 is an enlarged schematic view of (A) an electrode for a super-capacitor where the electrode is formed of layers of densely packed hierarchically porous carbon particles of this invention applied to a metal current collector (shown in cross-hatched section). In operation of the capacitor the carbon particles would be infiltrated with a liquid electrolyte. The (B) portion of FIG. 2 is a further enlarged schematic illustration of a hierarchically porous spherical carbon particle enabling effective infiltration and transport of electrolyte ions. The (C) portion of FIG. 2 is a cross-sectional view of the particle of (B) schematically showing the interconnected hierarchical pore structure.

As described below in this specification this generally spherical, hierarchically porous and graphitic carbon particle material may be formed as an electrode of a super-capacitor. As illustrated in FIG. 2, Part A, the small particles of this electrochemically active, conductive, porous carbon may be mixed with small amounts of carbon black (not illustrated) and a suitable polymeric binder (not illustrated) for coating as an integral layer of electrode material onto a metal or metal foam or metal mesh current collector. As part of an electrode in an electrochemical device, the electrode material is immersed in a solution of a suitable electrolyte containing ions of the electrolyte. The hierarchical pore size of the active carbon material of this invention enables effective transport of electrolyte ions due to the interconnected pores of different sizes (i.e., micropores, mesopores, and macropores) as illustrated schematically in parts B and C of FIG. 2.

Samples of the thus prepared hierarchically porous and graphitic carbon particles of this invention were subjected to characterization testing and comparative testing with other carbon materials as now described. These carbon particles are sometimes referred to as aerosol-carbon particles in this specification.

Commercially available activated carbon, AC, was obtained (Yihuan Carbon Co., Ltd. Fuzhou, China) and, after vacuum-drying, was used for comparison. Also, multi-walled carbon nanotubes, CNTs, were synthesized using a catalytic chemical vapor deposition in a nano-agglomerate fluidized bed. Before electrode fabrication, CNTs were functionalized by attaching carboxylic groups on the surface.

Characterization: Nitrogen sorption isotherms were measured at 77 K with a Micromeritics ASAP 2020 analyzer (Micromeritics Instrument Corporation, Norcross, Ga.). Specific surface areas ($S_{BET}$) were calculated by the Brunauer-Emmett-Teller (BET) method using the adsorption branch in a relative pressure range from 0.04 to 0.25. Scanning electron microscopy (SEM) experiments were conducted on a JEOL JSM-6700 FE-SEM (JEOL Ltd., Japan). Transmission electron microscopy (TEM) experiments were conducted on a Philips CM120 operated at 120 kV (Philips/FEI Inc., Eindhoven, The Netherlands).

Electrode Fabrication and Electrochemical Measurements: The aerosol-carbon particles, AC and CNTs were assembled onto nickel foam current collectors. Briefly, 85% of the electrochemically active material, 5% carbon black, and 10% poly (vinylidene fluoride) (PVDF) dispersed in N-methylpyrrolidinone (NMP) were mixed to form slurries. The homogenous slurries were coated on nickel foam substrates and dried at 80° C. for 10 min under vacuum. As-formed electrodes were then pressed at a pressure of 2 MPa and further dried under vacuum at 100° C. for another 12 h. Electrodes were obtained by coating an active mass of 1~3 mg on each current collector (0.5 cm*0.5 cm).

The electrochemical measurements were carried out on a Solartron 1860/1287 Electrochemical Interface (Solartron Analytical, Oak Ridge, Tenn.). The electrolyte solution was a 1M tetraethyl ammonium tetrafluoroborate ($NEt_4BF_4$) in propylene carbonate (PC) solution and platinum foil was used as the counter electrode. Silver wire was used as a quasi-reference electrode. CV measurements were carried out in an argon-filled glove box using cutoff voltages of −1.5 and 1.2 V versus Ag. The specific capacitance, $C_s$ (F g$^{-1}$) of the electrode materials was calculated from the discharge curve of galvanostatic cycles, according to $C=I/(dV/dt) \approx I/(\Delta V/\Delta t)$, where I is the constant discharge current density, E is the cell voltage, and dV/dt is the slope of the discharge curve. The EIS tests were operated in the frequency range of 10 mHz-100 kHz with 10 mV AC amplitude. The gravimetric capacitance, C was also calculated according to $C=1/[2\pi f \operatorname{Im}(Z)M]$, where f is the operating frequency (Hz), Im(Z) is the imaginary part of the electrode resistance (ohm), and M (g) is the mass of electrode.

To make 2032 type coin cells, glass fiber (GF/D) from Whatman was used as a separator. The cells were assembled in a glove box under an argon atmosphere. Charge and discharge measurements and long-term cycling tests were carried out by LAND CT2000 (Wuhan Jinnuo Electronics, Ltd., Wuhan, China) at different current densities. Symmetric cells were charged and discharged between 2.7 and 0 V. The specific capacitance, and power and energy density were calculated based on the total mass of anode and cathode materials. Energy density was calculated using $E=\frac{1}{2} CV^2$, where C is the total cell capacitance and V is the cell operation potential. The maximum power density was calculated by $P_{max}=V^2/(4ESR*M)$, where ESR is the equivalent series resistance and M (g) is the total mass of anode and cathode materials.

Results

FIG. 3 shows the representative scanning electron microscope (SEM) and transmission electron microscope (TEM) images of the aerosol-carbon particles. It is shown in FIG. 3A that most of the particles are densely packed. The pressed pellets reached a density as high as 0.75 g cm$^{-3}$, which is much higher than that of commercial activated carbon with similar porosity (~0.5 g cm$^{-3}$). For device applications, in order to increase overall device capacitance, it is generally necessary to increase electrode porosity, which inevitably reduces the electrode density. Therefore, a high gravimetric capacitance is often achieved by compromising rate capability and volumetric capacitance. The capability to synthesize high-surface-area carbon with high packing density is therefore essential to ensure both high gravimetric and volumetric densities.

Figure 3A:
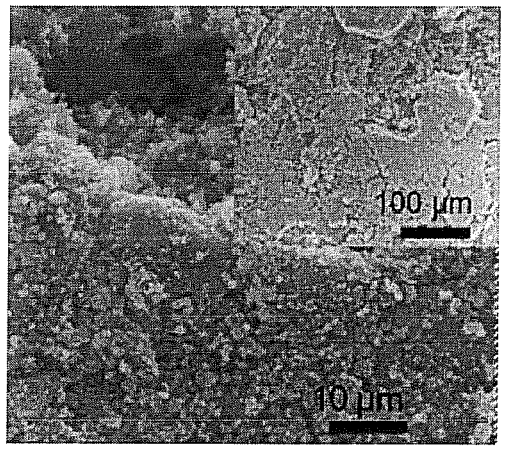
FIG. 3 presents SEM and TEM images of the hierarchically porous aerosol-carbon particles (i.e., produced by the subject aerosol process): A) a low-magnification SEM image showing densely packed particles, (B) a high-magnification SEM image showing spherical morphology with particle diameters ranging from 50 to about 3 micrometers, (C) a TEM image of the hierarchically porous aerosol-carbon particles, (D) high-magnification TEM showing the graphitized carbon structure.
Figure 3B:
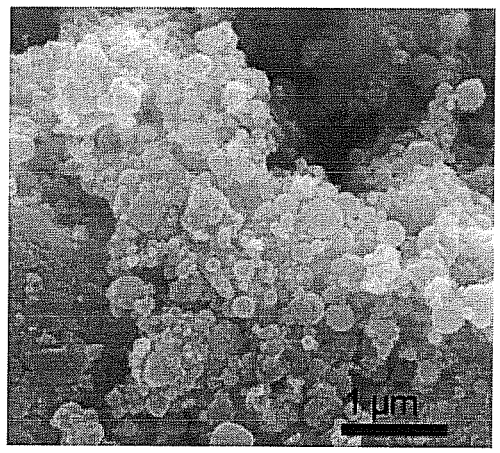
Figure 3C:
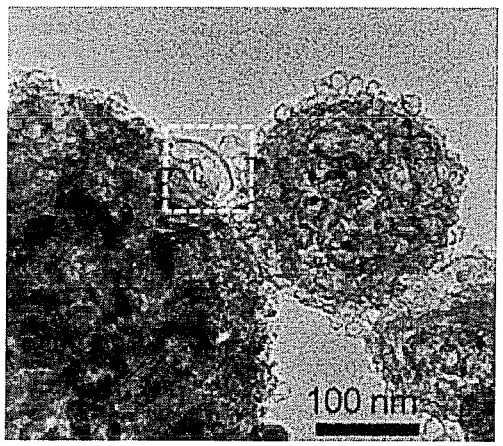
Figure 3D:
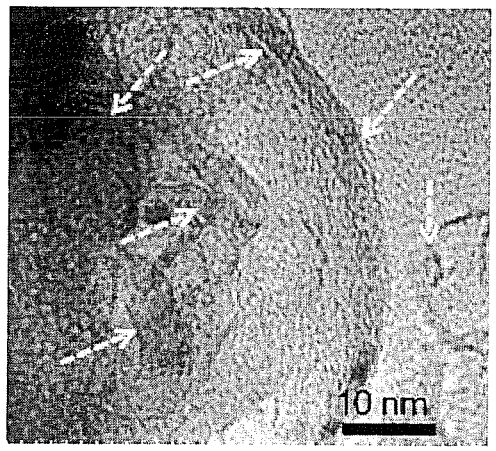

High-magnification SEM shows that these particles are polydisperse with diameters mainly ranging from 50 to 300 nm (FIG. 3B), which are much smaller than that of activated carbon normally used in commercial devices (5-20 μm). TEM image (FIG. 3C) reveals a highly porous sponge- or foam-like pore structure with interconnected mesopores and micropores. The diameters of the mesopores are concentrated around 10-20 nm (FIG. 4B), which is consistent with the size of the colloidal silica template used (average diameter of 13 nm). The formation of micropores below about 2 nm in diameter is due to the removal of silica clusters that were uniformly distributed within the carbon framework. High-resolution TEM (FIG. 3D) image suggests that the "bubbles" observed in FIG. 3C are graphite shells formed by the catalytic carbonization of sucrose. The formation of such graphite shells, which improve the electrode conductivity, is further confirmed by their intense (002) graphite x-ray diffraction peak.

Figure 4A:
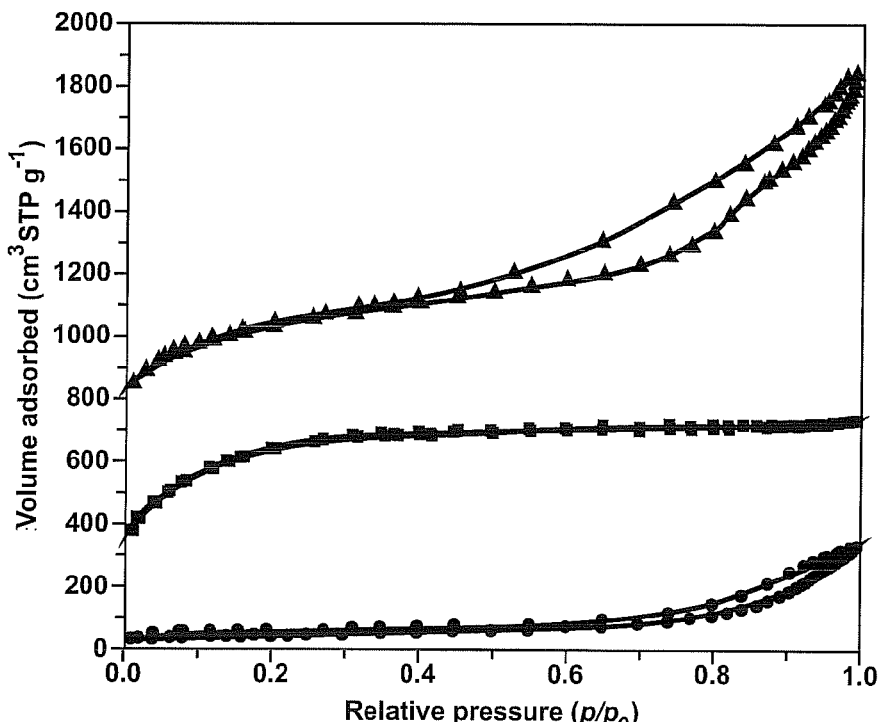
FIG. 4 presents nitrogen sorption isotherms (4A) and pore size distributions (4B) of the hierarchically porous aerosol-carbon particles of this invention (▲), of commercial activated carbon particles, AC (■) and commercial carbon nanotubes, CNTs (●).
Figure 4B:
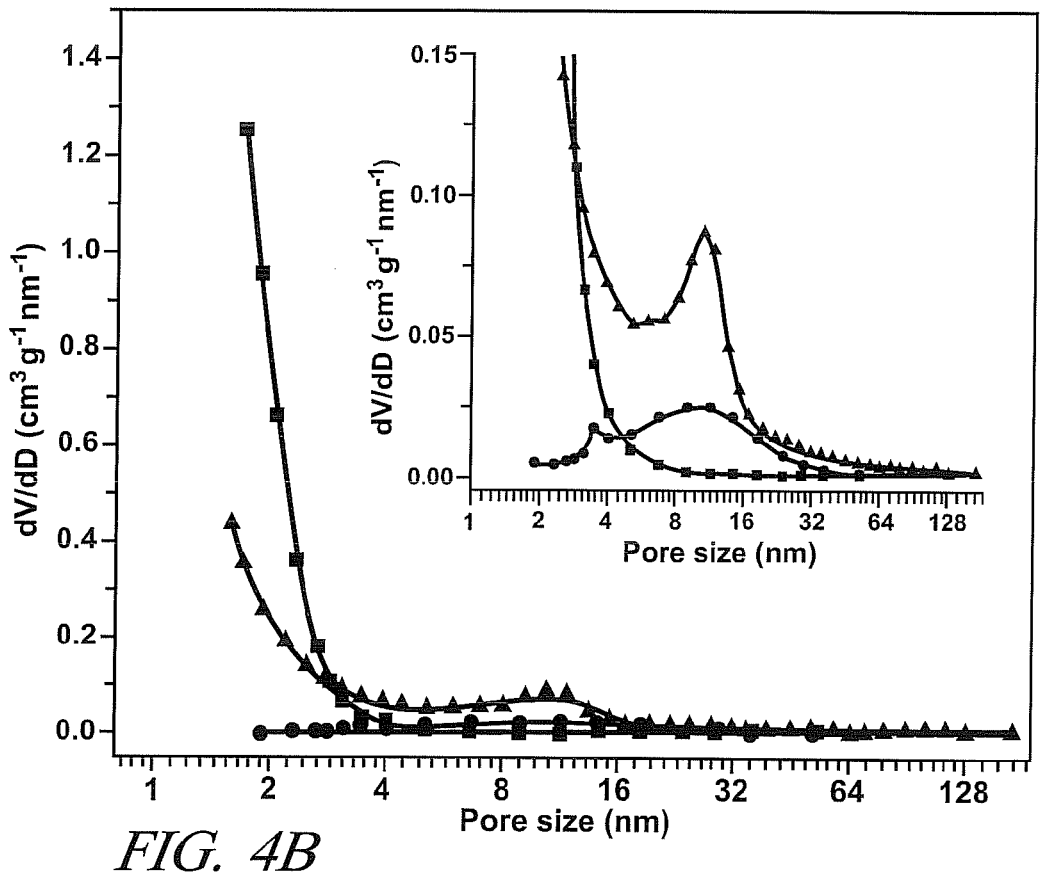

Pore structure of the particles was investigated using nitrogen sorption experiments. FIG. 4A shows nitrogen sorption isotherms and pore size distributions (4B) of the particles, which clearly suggest the coexistence of micropores and mesopores. The first nitrogen-uptake step, at a relative pressure below 0.2, is contributed by the micropores templated from silica clusters. The second nitrogen-uptake step, at a relative pressure between 0.6 and 0.9, is attributed to the mesopores templated from colloidal silica particles. These mesopores are narrowly distributed and centred at 11 nm, which is consistent with the size of the colloidal silica template. These particles exhibit a high pore volume of 2.02 cm$^3$ g$^{-1}$ and Brunauer-Emmett-Teller (BET) surface area of 1522 m$^2$ g$^{-1}$, of which ~80% (1208 m$^2$ g$^{-1}$) is contributed by external surface, as calculated from the t-plot method. To better understand how such pore structure affects energy storage performance, commercial activated carbon (AC) and multi-walled CNTs were also studied for comparison. As shown in FIG. 4(A), the AC shows typical type I isotherms with uptake at low relative pressure, suggesting a microporous structure (pore diameter <2 nm) with an extremely high surface area of 2549 m$^2$ g$^{-1}$ of which ~64% (1627 m$^2$ g$^{-1}$) is contributed by the external surface. As expected, the CNTs have quite limited surface area (156 m$^2$ g$^{-1}$) with some mesoporous structure resulting from stacking of the nanotubes. The external surface area (123 m$^2$ g$^{-1}$) accounts for ~79% of the total CNTs surface area.

This unique hierarchical pore structure endows the particles with outstanding capacitive performance. FIG. 5 compares cyclic voltammetry (CV) plots of the aerosol-carbon particles, AC and CNT electrodes at potential sweep rates of 5 (FIG. 5A) and 50 mV s$^{-1}$ (FIG. 5B) in three-electrode cells using platinum foil as the counter electrode, silver wire as the quasi-reference electrode and 1 M NEt$_4$BF$_4$ in propylene carbonate (PC) as the electrolyte. At a potential sweep rate of 5 mV s$^{-1}$, all CV curves show typical capacitive behavior, as evidenced by their nearly rectangular voltammograms. For AC electrode, the CV plot is fully developed at positive polarization, which is associated with BF$_4^-$ (1.35 nm) adsorption. The CV plot shows obvious distortion at negative polarization, though, which is associated with adsorption of NEt$_4^+$ (1.40 nm). Generally, commercial activated carbons have abundantly irregular micropores and small mesopores in the range of 0.3-4 nm with narrow bottlenecks that limit ion transport and adsorption. In addition, at sweep rates as low as 5 mV s$^{-1}$, ohmic drop across the electrode is not significant. Therefore, such an asymmetric CV characteristic could be attributable to a micropore-size effect on electrode kinetics, which has been recently confirmed on carbide-derived carbons in the same electrolyte system. When potential sweep rates reach 50 mV s$^{-1}$ (FIG. 5B), CV plots of the AC electrode distort dramatically over the whole potential range. Such behavior can be ascribed to both the increased ohmic drop and the limited ion transport within their tortuous pore structure.

Figure 5A:
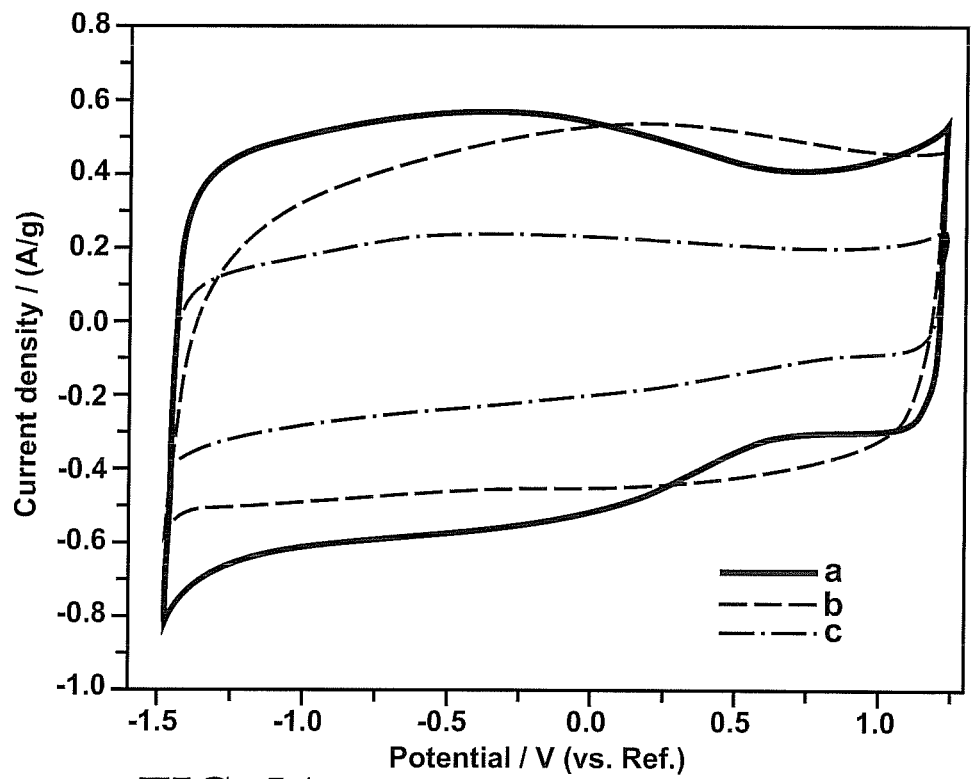
FIG. 5 presents cyclic voltammograms of various carbon electrodes at scan rate of (A) 5 mV s$^{-1}$ and (B) 50 mV s$^{-1}$ (a: aerosol-carbon particle; b: AC; c: CNTs); (C) capacitance current dependence on potential sweep rates at potential of −0.4 V (vs. Ref.): and (D) capacitance-frequency dependence of the aerosol-carbon particles (▲), AC (■) and CNTs (●).
Figure 5B:
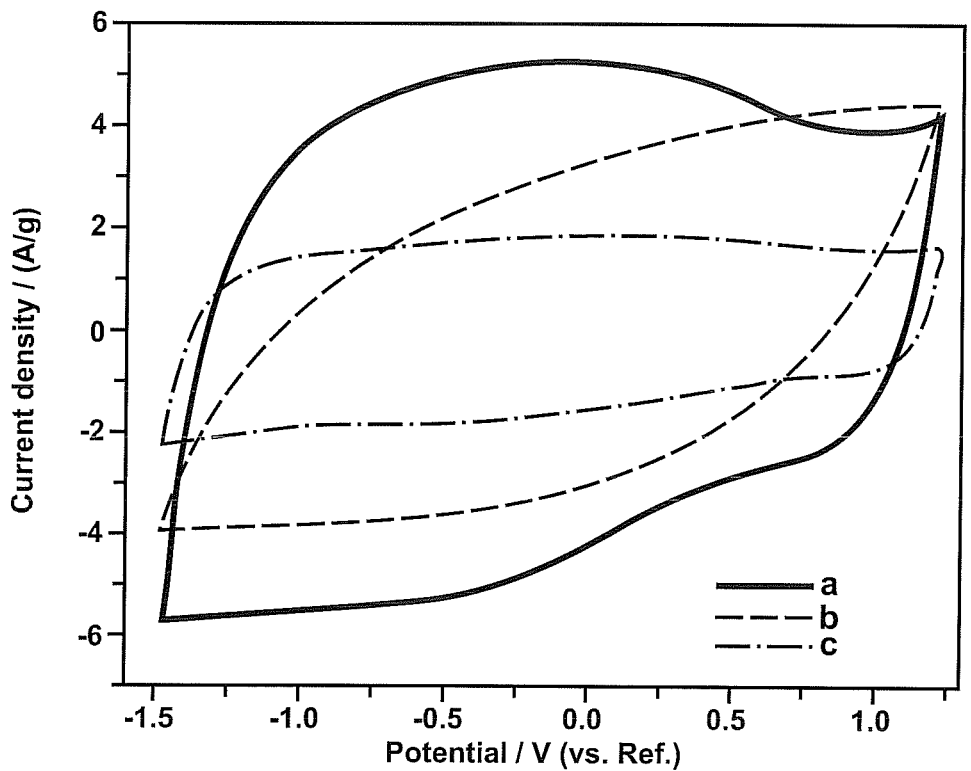
Figure 5C:
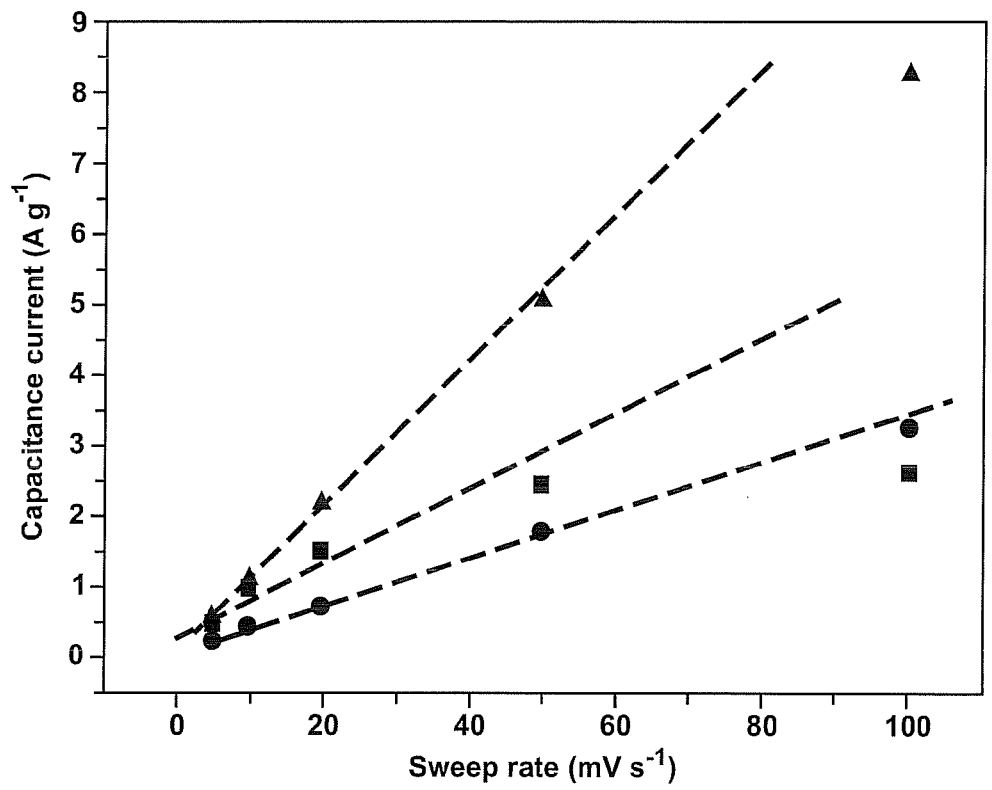

By comparison, at both potential sweep rates, the CV plots of the aerosol-carbon- and CNT-based electrodes show symmetric characteristics at both positive and negative polarizations, suggesting facile ion transport and adsorption behavior. Although there are broad humps at potentials below 0.5 V on the CV curves of the aerosol-carbon electrodes, the charge and discharge processes are defined to not be limited by any kinetics issue since the voltammetric response is very fast. FIG. 5C shows the voltammetric current (i.e., the current value at potential of −0.4 V) dependence on potential sweep rate. Unlike the AC electrodes, a perfect linear plot can be seen at sweep rates ranging from 5 to 50 mV s$^{-1}$ for the aerosol-carbon electrodes, confirming that their currents are purely capacitive in nature. Note that, due to the large ohmic drop, the current response at high sweep rate of 100 mV s$^{-1}$ is nonlinear. This phenomenon was not observed for CNT electrodes due to their better conductivity and lower porosity. For both the aerosol-carbon and CNT electrodes, only limited distortion of CV curves can be observed when the sweep rate increases from 5 to 100 mV s$^{-1}$, demonstrating very high rate-capability. We attribute this excellent capacitive performance to facile ion transport in their open pore structures and good electrode conductivity.

Figure 5D:
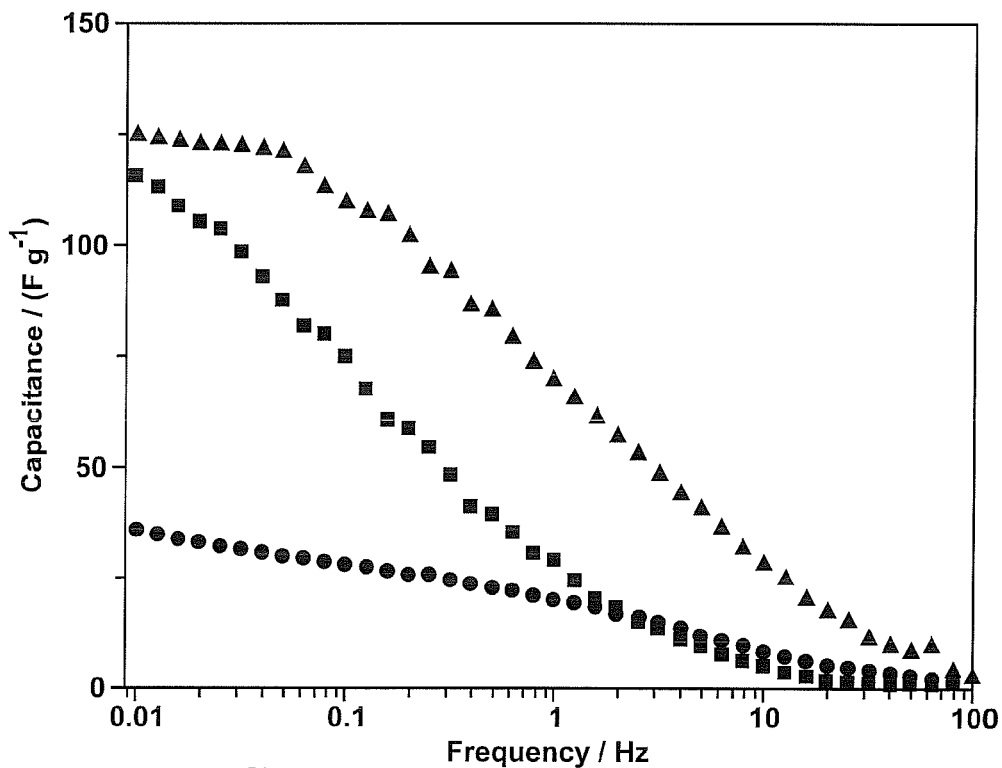

The facilitated ion-transport kinetics within hierarchical pore channels was further studied by electrochemical impedance spectroscopy (EIS). FIG. 5D compares capacitance dependence on frequency (10 mHz to 100 kHz) of each electrode. Clearly, the capacitance gradually decreases with increasing frequency, which is a common for porous carbon electrodes. The CNT electrodes exhibit slow capacitance drops due to fast ion transport and adsorption on their surface. Similarly, because of their open pore structure, the capacitance of aerosol-carbon electrodes approaches saturation at frequencies close to 0.1 Hz, meaning that their ion-adsorption can reach equilibrium in 10 s. By comparison, the AC electrodes show no sign of saturation at frequencies as low as 0.001 Hz, indicating slow electrolyte ions diffusion within their tortuous pore structure. Also, aerosol-carbon electrodes retain over 60% of their maximum capacitance at a frequency of 1 Hz, about three times higher than that of AC electrodes. This result further confirms the importance of creating easy ion-transport pathways in pursuit of high-rate supercapacitor electrodes.

Figure 6A:
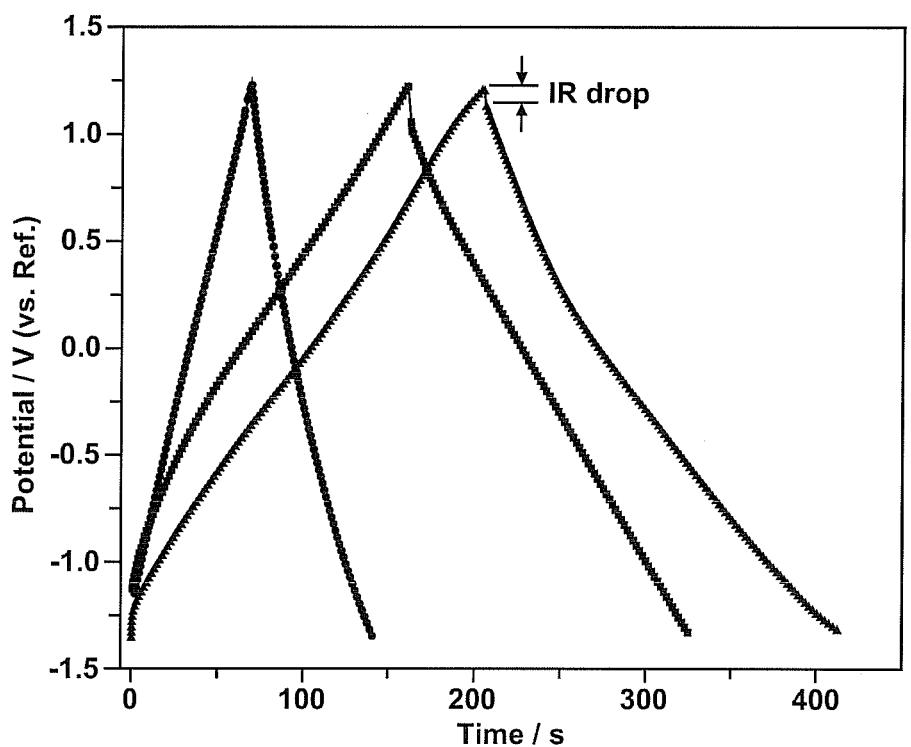
FIG. 6 presents constant current charge/discharge curves of different electrodes at current density of 1 A g$^{-1}$ (A), specific capacitance as a function of current density (B), and Ragone plots of various carbon electrodes (C) (aerosol-carbon particles: ▲; AC: ■; CNTs: ●; LN-porous carbon: □; SK2200: ▶; Ness4600: ▼), and long-term cycling performance of symmetric supercapacitor made from aerosol carbon particles (D).
Figure 6B:
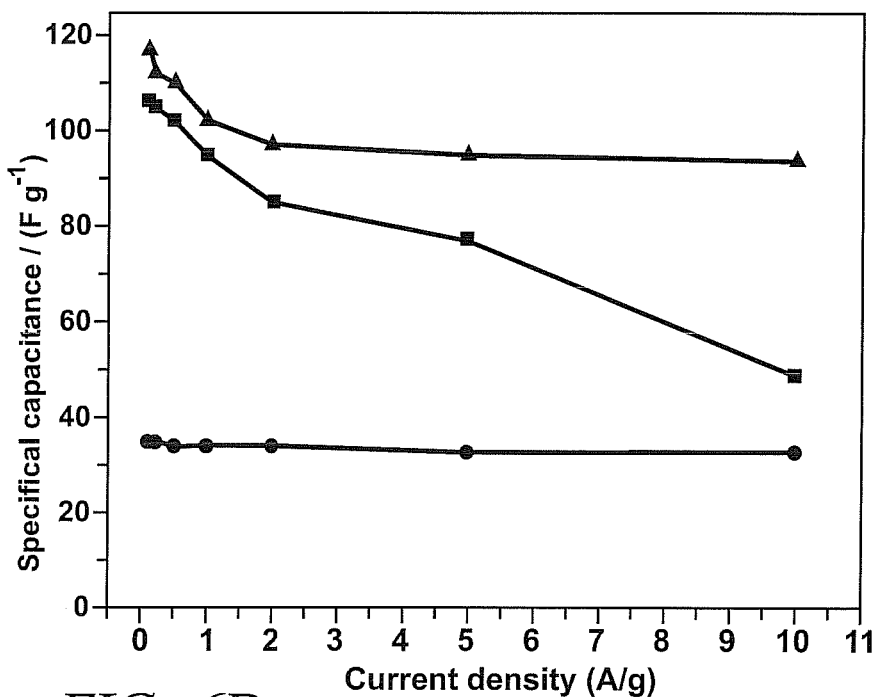

To further quantify their specific capacitances, galvanostatic charge/discharge tests were performed, and normalized specific capacitances $C_s$ (F g$^{-1}$) were calculated from the discharge curves of galvanostatic profiles. For example, as shown in FIG. 6A, at current densities of 1 A g$^{-1}$ the CNT-, AC- and aerosol-carbon-based electrodes show capacitances of 34, 95, and 102 F g$^{-1}$, respectively. The aerosol-carbon electrodes display a more pronounced ohmic loss (IR drop) than the CNTs electrodes, but the IR drop is much less than that of the AC electrodes. Calculated from the IR drop, the maximum power density of the aerosol-carbon electrodes (55 kW kg$^{-1}$) reach ~70% of the CNT electrode (78 kW kg$^{-1}$), which is 2.2 times that of the AC electrodes (25 kW kg$^{-1}$). Different current densities from 0.1 to 10 A g$^{-1}$ were used to further investigate the rate capability (FIG. 6B). The CNT electrodes keep ~95% of its initial $C_s$ (35 F g$^{-1}$) as current density increase from 0.1 to 10 A g$^{-1}$. Although showing a much higher $C_s$ of 106 F g$^{-1}$ at current density of 0.1 A g$^{-1}$, the AC electrodes have only 45% capacitance retention (50 F g$^{-1}$) at 10 A g$^{-1}$. By comparison, the aerosol-carbon electrodes show a high $C_s$ of 115 F g$^{-1}$ at a current density of 0.1 A g$^{-1}$, and retain 83% of this capacitance (95 F g$^{-1}$) at 10 A g$^{-1}$, displaying excellent high-rate performance. Such capacitive performance is superior to the pore-opened single-walled CNTs with surface area of 2200 m$^2$ g$^{-1}$ and chemically modified graphene with surface area of 705 m$^2$ g$^{-1}$.

Figure 6C:
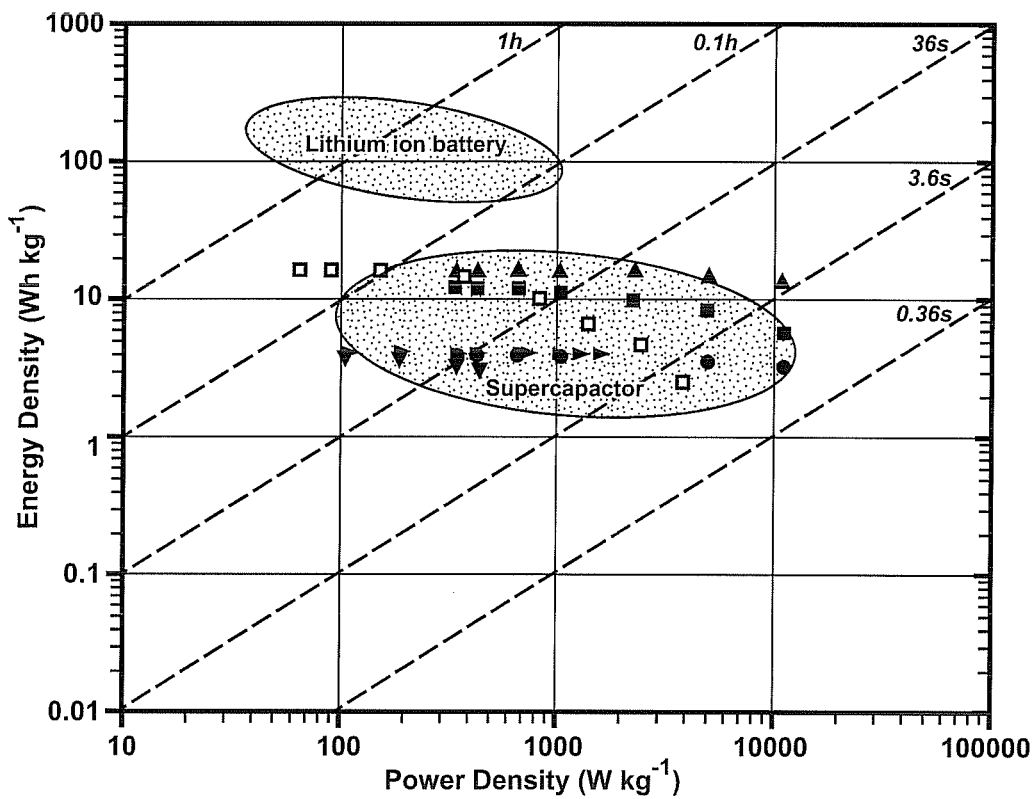
Figure 6D:
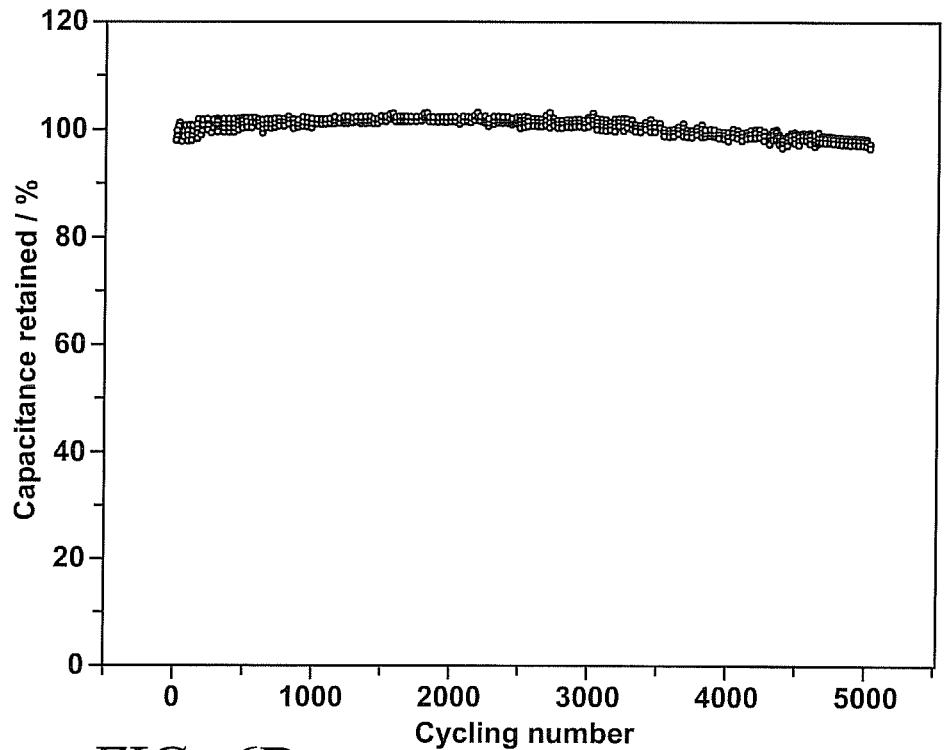

Consistent with electrochemical studies, these hierarchical aerosol-carbon particles exhibit outstanding device performance. In this work, symmetric supercapacitors were assembled to evaluate energy and power performance. The AC supercapacitor possesses an energy density of 27 Wh kg$^{-1}$ at a power output of 270 W kg$^{-1}$ when only considering the mass of electrode active materials, however, its energy density drops to 12 Wh kg$^{-1}$ at a power density of 20 kW kg$^{-1}$. The CNT supercapacitor shows good rate capability but low energy density due to its low capacitance. In comparison, the aerosol-carbon supercapacitor reaches an energy density of 30 Wh kg$^{-1}$ at a power density of 270 W kg$^{-1}$, or 24 Wh kg$^{-1}$ at 25 kW kg$^{-1}$. For better comparison, all the energy and power density are normalized to the mass of whole device using a packaging factor of 0.4. FIG. 6C shows the Ragone plot, which displays the energy density dependence on the power output of various symmetric supercapacitors. The aerosol-carbon supercapacitor shows superior performance to other devices. In particular, at 4 s of charge/discharge, the energy density of the aerosol-carbon supercapacitor is about 2 and 3 times higher than that of the AC and CNT supercapacitors, respectively. Besides their high energy and high power performance, aerosol-carbon supercapacitors exhibit outstanding cycling stability. FIG. 6D shows the results of long-term cycling tests at a current density of 2 A g$^{-1}$, suggesting capacitance retention of ~98% after 5000 cycles of charge and discharge.

In summary, the synthesis of a class of graphitized porous carbon particles has been demonstrated using a continuous, scalable approach. Such carbons contain hierarchical pore structure and graphitized shells, providing a new material platform for high-performance supercapacitors with high packing density. This new family of porous carbons could also be adapted for battery electrodes, fuel-cell catalyst supports and other applications.

The invention claimed is:

1. A method of making nanometer size graphitic carbon particles having interconnected micropores and mesopores, the method comprising:

forming a colloidal dispersion of liquid water droplets in a stream of inert gas, the liquid water droplets comprising an aqueous solution of a carbohydrate and a transition metal compound for promoting carbonization of the carbohydrate, the aqueous solution containing silica particles as templates for the mesopores and orthosilicate clusters as templates for the micropores, the ratio of silica particles and orthosilicate clusters being selected to yield a desired proportion of mesopores and micropores;

heating the stream to evaporate the water and to form solid particles of the dissolved and dispersed constituents;

collecting the solid particles from the stream;

heating the collected particles to carbonize the carbon compound to form graphite particles containing the metal and template materials;

and removing the metal promoter and silicon-containing material from the graphite particles to form porous, generally spherical graphite particles with diameters in the range of fifty to three hundred nanometers and with micropores up to about 2 nanometers in largest dimension interconnected with mesopores of about two to twenty nanometers in largest dimension, and the porous graphite particles have a BET surface area of about 1500 m$^2$g$^{-1}$ or higher.

2. A method as recited in claim 1 in which the liquid droplets are formed from an aqueous solution of a carbohydrate and a transition metal compound with dispersed silica particles and dispersed clusters of ethyl orthosilicate.

3. A method as recited in claim 1 in which the liquid droplets are formed from an aqueous solution of sucrose and nickel nitrate with dispersed silica particles and dispersed clusters of ethyl orthosilicate.

4. A method as recited in claim 2 in which the liquid droplets are carried in a stream of nitrogen and the stream is heated to a temperature of about 450° C. for a time to evaporate the solvent and form solid particles of the dissolved and dispersed constituents.

5. A method as recited in claim 4 in which the solid particles are carbonized at a temperature of about 900° C. in a nitrogen atmosphere to form the porous graphite particles.

\* \* \* \* \*